United States Patent
Mizuno et al.

(10) Patent No.: US 12,072,431 B2
(45) Date of Patent: Aug. 27, 2024

(54) POSITION SPECIFYING SYSTEM FOR MOBILE OBJECT AND MOBILE OBJECT USED FOR THE POSITION SPECIFYING SYSTEM

(71) Applicants: TOYOTA JIDOSHA KABUSHIKI KAISHA, Toyota (JP); HITACHI INDUSTRIAL EQUIPMENT SYSTEMS CO., LTD., Tokyo (JP)

(72) Inventors: Takanobu Mizuno, Nagoya (JP); Tomohisa Kohiyama, Tokyo (JP)

(73) Assignees: TOYOTA JIDOSHA KABUSHIKI KAISHA, Toyota (JP); HITACHI INDUSTRIAL EQUIPMENT SYSTEMS CO., LTD., Tokyo (JP)

( * ) Notice: Subject to any disclaimer, the term of this patent is extended or adjusted under 35 U.S.C. 154(b) by 420 days.

(21) Appl. No.: 17/270,939

(22) PCT Filed: Feb. 8, 2019

(86) PCT No.: PCT/JP2019/004628
§ 371 (c)(1),
(2) Date: Feb. 24, 2021

(87) PCT Pub. No.: WO2020/161886
PCT Pub. Date: Aug. 13, 2020

(65) Prior Publication Data
US 2021/0356554 A1  Nov. 18, 2021

(51) Int. Cl.
*G01S 5/14* (2006.01)
*G01S 5/02* (2010.01)
(Continued)

(52) U.S. Cl.
CPC .............. *G01S 5/14* (2013.01); *G01S 5/0221* (2013.01); *G01S 19/48* (2013.01); *G05D 1/0278* (2013.01); *G05D 1/028* (2013.01)

(58) Field of Classification Search
CPC ......... G05D 2201/0213; G05D 1/0278; G05D 1/0212; G05D 1/0274; G08G 1/0112;
(Continued)

(56) References Cited

U.S. PATENT DOCUMENTS 8,130,141 B2 * 3/2012 Pattabiraman ........ H04W 72/30
342/357.29
9,587,951 B1 * 3/2017 Hamida .................. G01S 19/50
(Continued)

FOREIGN PATENT DOCUMENTS

CN  108761390 A  11/2018
CN  108897000 A  11/2018
(Continued)

*Primary Examiner* — Steven B Theriault
(74) *Attorney, Agent, or Firm* — Oliff PLC (57) ABSTRACT

A radio transmitter in a first radio communication device transmits first position information and first time information to a radio receiver of a vehicle. Also, a radio transmitter in a second radio communication device transmits second position information and second time information to the radio receiver. When the radio receiver of the vehicle receives the respective pieces of information, a position specification processing unit specifies the position of the vehicle based on the received pieces of information. Thus, the position of the vehicle can be specified with high accuracy even when signals from GNSS satellites cannot be received.

13 Claims, 8 Drawing Sheets

(51) Int. Cl.
*G01S 19/48* (2010.01)
*G05D 1/00* (2006.01)

(58) Field of Classification Search
CPC ........... G08G 1/0129; G08G 1/096725; G08G 1/017; G08G 1/22; G08G 1/20; B60W 60/00; B60W 2556/65; G01C 21/30; G01C 21/32; G01C 21/3691; G01S 19/10; G01S 5/0027; G01S 19/42; G01S 7/4808; G01S 19/40; G01S 19/48; G01S 5/14; G01S 19/39; H04W 4/02; H04W 4/029; H04W 4/025; H04W 4/024; H04W 4/023; H04W 64/006; H04W 64/003

See application file for complete search history.

(56) References Cited

U.S. PATENT DOCUMENTS

| | | | | |
|---|---|---|---|---|
| 9,766,322 | B2* | 9/2017 | Taylor, Jr. | G01S 5/14 |
| 10,715,977 | B2* | 7/2020 | Jiang | H04W 16/14 |
| 10,989,817 | B2* | 4/2021 | Stroiescu | G01S 19/19 |
| 2001/0026241 | A1 | 10/2001 | Tamura et al. | |
| 2004/0258012 | A1 | 12/2004 | Ishii | |
| 2007/0030841 | A1* | 2/2007 | Lee | H04M 7/006 |
| | | | | 370/352 |
| 2009/0005061 | A1 | 1/2009 | Ward et al. | |
| 2010/0097208 | A1* | 4/2010 | Rosing | G06Q 10/087 |
| | | | | 340/572.1 |
| 2010/0222081 | A1 | 9/2010 | Ward et al. | |
| 2011/0105142 | A1 | 5/2011 | Sawai | |
| 2011/0148699 | A1* | 6/2011 | Anderson | G01S 19/34 |
| | | | | 342/357.31 |
| 2011/0285589 | A1 | 11/2011 | Bull | |
| 2011/0288771 | A1* | 11/2011 | Mazlum | G01S 19/50 |
| | | | | 701/469 |
| 2011/0291882 | A1* | 12/2011 | Walsh | G01S 5/0289 |
| | | | | 342/464 |
| 2012/0007776 | A1* | 1/2012 | Ariel | G01S 19/11 |
| | | | | 342/357.48 |
| 2013/0063307 | A1* | 3/2013 | Krasner | G01S 19/48 |
| | | | | 342/387 |
| 2013/0324154 | A1* | 12/2013 | Raghupathy | H04W 4/025 |
| | | | | 455/456.1 |
| 2014/0266907 | A1* | 9/2014 | Taylor, Jr. | G01S 5/0226 |
| | | | | 342/387 |
| 2014/0292568 | A1* | 10/2014 | Fleming | G01S 5/0226 |
| | | | | 342/357.31 |
| 2015/0168560 | A1* | 6/2015 | Ralphs | G01S 19/14 |
| | | | | 701/23 |
| 2015/0338524 | A1* | 11/2015 | Ben Moshe | G01S 19/52 |
| | | | | 342/357.33 |
| 2015/0378025 | A1* | 12/2015 | Kim | G01S 19/22 |
| | | | | 342/357.4 |
| 2016/0247395 | A1* | 8/2016 | Sugihara | G08G 1/20 |
| 2016/0332624 | A1* | 11/2016 | Tezuka | B60W 30/16 |
| 2016/0377437 | A1* | 12/2016 | Brannstrom | G05D 1/0274 |
| | | | | 701/501 |
| 2017/0059715 | A1* | 3/2017 | Wietfeldt | G01S 19/28 |
| 2017/0067999 | A1* | 3/2017 | Chhokra | G01S 19/42 |
| 2017/0074964 | A1* | 3/2017 | Xu | G01S 13/74 |
| 2017/0124775 | A1* | 5/2017 | Breed | G08G 1/017 |
| 2017/0363423 | A1* | 12/2017 | Dormody | G01L 27/002 |
| 2018/0038937 | A1* | 2/2018 | Afzal | G01S 5/0226 |
| 2018/0090004 | A1* | 3/2018 | Kuraoka | G08G 1/017 |
| 2018/0255525 | A1* | 9/2018 | Uchiyama | H04W 56/0015 |
| 2019/0033465 | A1* | 1/2019 | Kido | G01S 19/40 |
| 2019/0155278 | A1* | 5/2019 | Idbrant | G01S 5/0284 |
| 2019/0162854 | A1* | 5/2019 | Plank | G01S 17/48 |

FOREIGN PATENT DOCUMENTS

| | | | | |
|---|---|---|---|---|
| EP | 2547082 A1 * | 1/2013 | | G01S 5/0263 |
| JP | H09-229691 A | 9/1997 | | |
| JP | 2004-350088 A | 12/2004 | | |
| JP | 2007-192771 A | 8/2007 | | |
| JP | 2008139292 A * | 6/2008 | | G01S 3/46 |
| JP | 2010-505299 A | 2/2010 | | |
| JP | 2010-093742 A | 4/2010 | | |
| JP | 2013-539010 A | 10/2013 | | |
| JP | 2015-61221 A | 3/2015 | | |
| JP | 2015-068674 A | 4/2015 | | |
| JP | 2015-97338 A | 5/2015 | | |
| JP | 2016-223891 A | 12/2016 | | |
| JP | 2018-109815 A | 7/2018 | | |
| WO | 2017/154131 A1 | 9/2017 | | |
| WO | 2018/087871 A1 | 5/2018 | | |

* cited by examiner

FIG.8

POSITION SPECIFYING SYSTEM FOR MOBILE OBJECT AND MOBILE OBJECT USED FOR THE POSITION SPECIFYING SYSTEM

TECHNICAL FIELD

The present invention relates to a system for specifying a position of a mobile object such as a vehicle and to a mobile object used for the system.

BACKGROUND ART

Conventionally, position specifying systems are provided, which acquire vehicle position information as information to be provided for autonomous driving of a vehicle, car navigation system and the like.

Patent Document 1 discloses the following processing: calculating a position and a receiver time of a host vehicle based on the orbit of a Global Navigation Satellite System (hereinafter referred to as the "GNSS") satellite and a first correction pseudorange that is a pseudorange of the GNSS satellite; obtaining a receiver time bias error of the pseudorange based on an average value of unknown errors that are differences between the first correction pseudorange and respective two-point distances between the position of the host vehicle and the positions of a plurality of satellites having a small multipath effect; and recalculating the position of the host vehicle based on a second correction pseudorange obtained by correcting the first correction pseudorange using the receiver time bias error.

Also, Patent Document 2 discloses the following processing: acquiring a coordinate value of a marker from an IMES message when the IMES message is received in underground space or the like where a signal from the GNSS satellite cannot be received; acquiring a relative position and a relative angle between a vehicle and the marker using a captured image by a camera; and calculating an absolute coordinate value and a travel direction of the vehicle.

PRIOR ART DOCUMENTS

Patent Documents

[Patent Document 1] WO 2017/154131 A1
[Patent Document 2] JP 2018-109815 A

SUMMARY OF THE INVENTION

Problem to be Solved by the Invention

However, in the position specifying system disclosed in Patent Document 1, it is not possible to calculate the second correction pseudorange when the signals from the respective GNSS satellites (e.g. GPS signals) and/or a signal indicating the first correction pseudorange cannot be received. With this system therefore, it is difficult to specify the position of the vehicle when the signals from the respective GNSS satellites cannot be received, and no means for solving this problem is considered.

Furthermore in the position specifying system disclosed in Patent Document 2, the camera cannot take the image of the marker when any disturbance exists near the marker or another object covers the marker. In this case also, it is difficult to specify the position of the vehicle, and no means for solving this problem is considered.

The present invention was made in consideration of the above circumstances, an object of which is to provide a system in which the position of a mobile object can be specified even when the position specification of the mobile object is not possible using the signals from the respective GNSS satellites.

Means for Solving the Problem

In order to solve the above problem and achieve the above object, a position specifying system for a mobile object of the present invention is a system specifying a position of the mobile object using a first radio communication device disposed in a structure and a second radio communication device disposed in a structure. First position information, which is information on a position in which the first radio communication device is disposed, is associated with the first radio communication device. Second position information, which is information on a position in which the second radio communication device is disposed, is associated with the second radio communication device. The first radio communication device includes a first time specifying unit that specifies a first time, and the second radio communication device includes a second time specifying unit that specifies a second time. The first radio communication device includes a first radio transmitter that transmits the first position information and the first time, and the second radio communication device includes a second radio transmitter that transmits the second position information and the second time. The mobile object includes: a radio receiver that receives the first position information and the first time transmitted from the first radio transmitter, and that receives the second position information and the second time transmitted from the second radio transmitter; and a position specification processing unit that specifies the position of the mobile object based on the first position information, the first time, the second position information and the second time, all of which are received by the radio receiver.

Effect of the Invention

With the present invention, it is possible to specify the position of the mobile object even when the position specification of the mobile object cannot be performed using the signals from the respective GNSS satellites.

MEANS FOR CARRYING OUT THE INVENTION

Hereinafter, embodiments of the present invention will be described with reference to the drawings. In the embodiments, the present invention is applied to a position specifying system that acquires position information on a vehicle as information used for autonomous driving and the like of the vehicle.

Before the detail description of the respective embodiments, the operations of the position specifying system of the present invention are outlined here. In this position specifying system, a first position specification processing operation and a second position specification processing operation are switched. In the first position specification processing operation, the vehicle acquires information transmitted by a plurality of GNSS satellites (that is, position information on each GNSS satellite, time information and the like), and the position of a vehicle (subject vehicle) is specified based on the information acquired by the vehicle. In the second position specification processing operation, the vehicle acquires information transmitted by a plurality of radio communication devices disposed in structures (e.g. buildings) fixed to the ground surface (that is, position information on each radio communication device, time information and the like), and the position of the vehicle (subject vehicle) is specified based on the information acquired by the vehicle.

Hereinafter, a plurality of embodiments will be described regarding the position specifying system capable of switching the above position specification processing operations.

First Embodiment

—Schematic Configuration of Position Specifying System—

Figure 1:
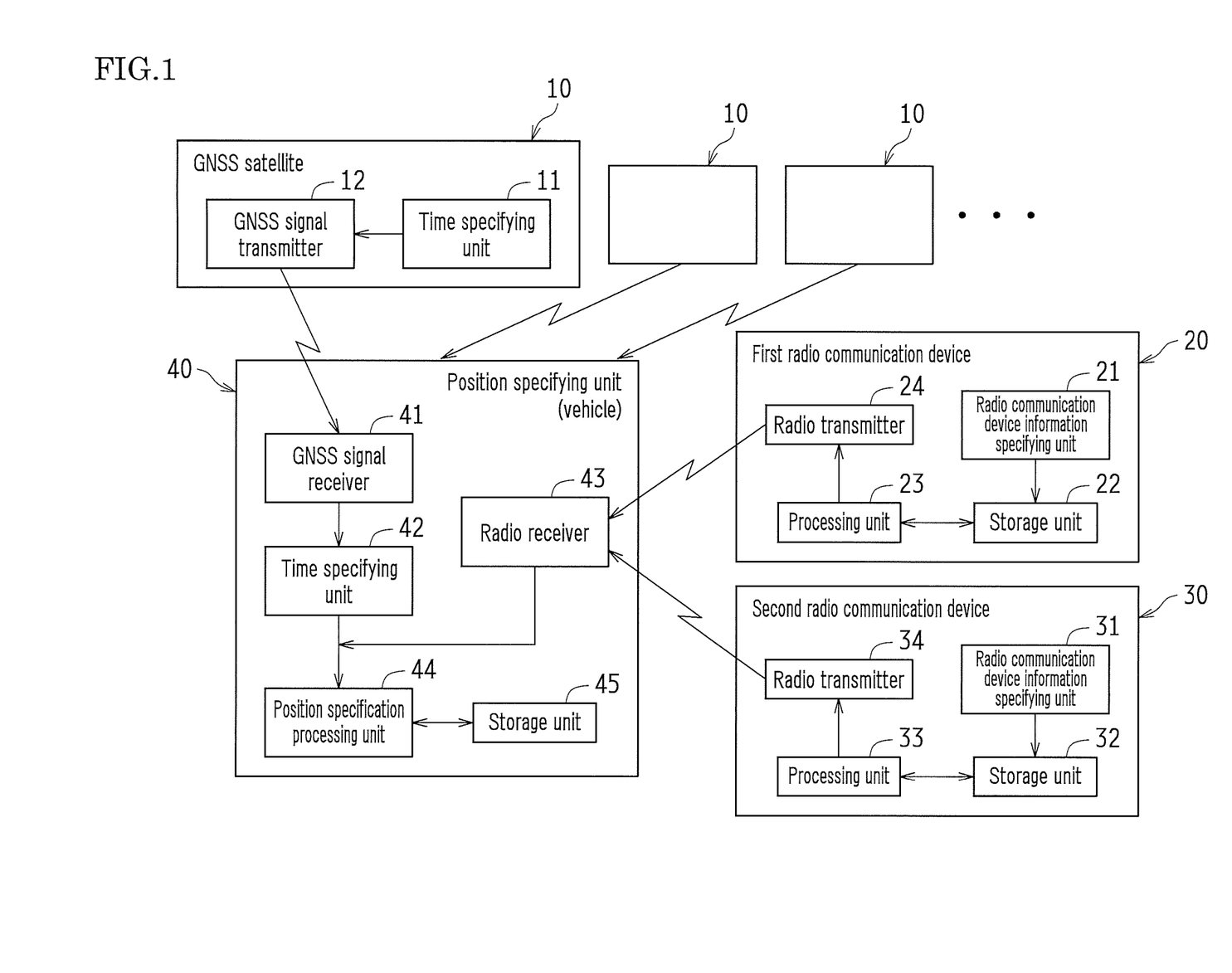
FIG. 1 is a block diagram indicating a schematic configuration of a position specifying system according to a first embodiment.

FIG. 1 is a block diagram indicating a schematic configuration of the position specifying system according to this embodiment.

As shown in FIG. 1, the position specifying system includes: a plurality of GNSS satellites 10; a first radio communication device 20; a second radio communication device 30; and a position specifying unit 40 mounted on a vehicle.

<GNSS Satellites>

The respective GNSS satellites (also simply referred to as the "satellites") 10 have the same configuration. Therefore, the configuration of the one satellite 10 is representatively described here.

The satellite 10 includes a time specifying unit 11 and a GNSS signal transmitter 12. Examples of the satellite 10 include GPS (Global Positioning System), Galileo and Glonass.

The satellite 10 constantly broadcasts (transmits as radio waves) a navigation message (satellite signal) toward the earth using the GNSS signal transmitter 12. The navigation message includes: satellite orbit information (i.e. ephemeris and almanac) on the corresponding satellite 10; a corrected value of the time specified by the time specifying unit 11; and a correction factor of the ionosphere. The navigation message is diffused by the C/A code, and constantly transmitted toward the earth on the L1 carrier wave. Also, the navigation message is diffused by the P code (precision code), and constantly transmitted toward the earth on the L2 carrier wave. The time specifying unit 11 specifies the current time using an atomic clock, and such a specified current time is included in the navigation message. Accordingly, the time constantly broadcasted is a high accuracy time.

The L1 carrier wave is a composite wave of a Sin wave modulated by the C/A code and a Cos wave modulated by the P code, and is subjected to quadrature modulation. The L2 carrier wave is a Cos wave modulated by the P code, and is subjected to quadrature modulation. The C/A code and the P code are pseudo-noise codes, which are code strings in which −1 and 1 are arranged irregularly and periodically.

Presently, dozens of satellites 10 orbit around the earth at an altitude of about 20,000 km. There are, for example, six earth orbits each of which inclines at 55 degrees relative to each other, and four or more satellites 10 are uniformly arranged on each orbit surface. Therefore, when the sky is open (i.e. when there is no high rise building or the like), at least four satellites 10 can be always observed (that is, the satellite signals from the satellites 10 can be received).

Figure 2:
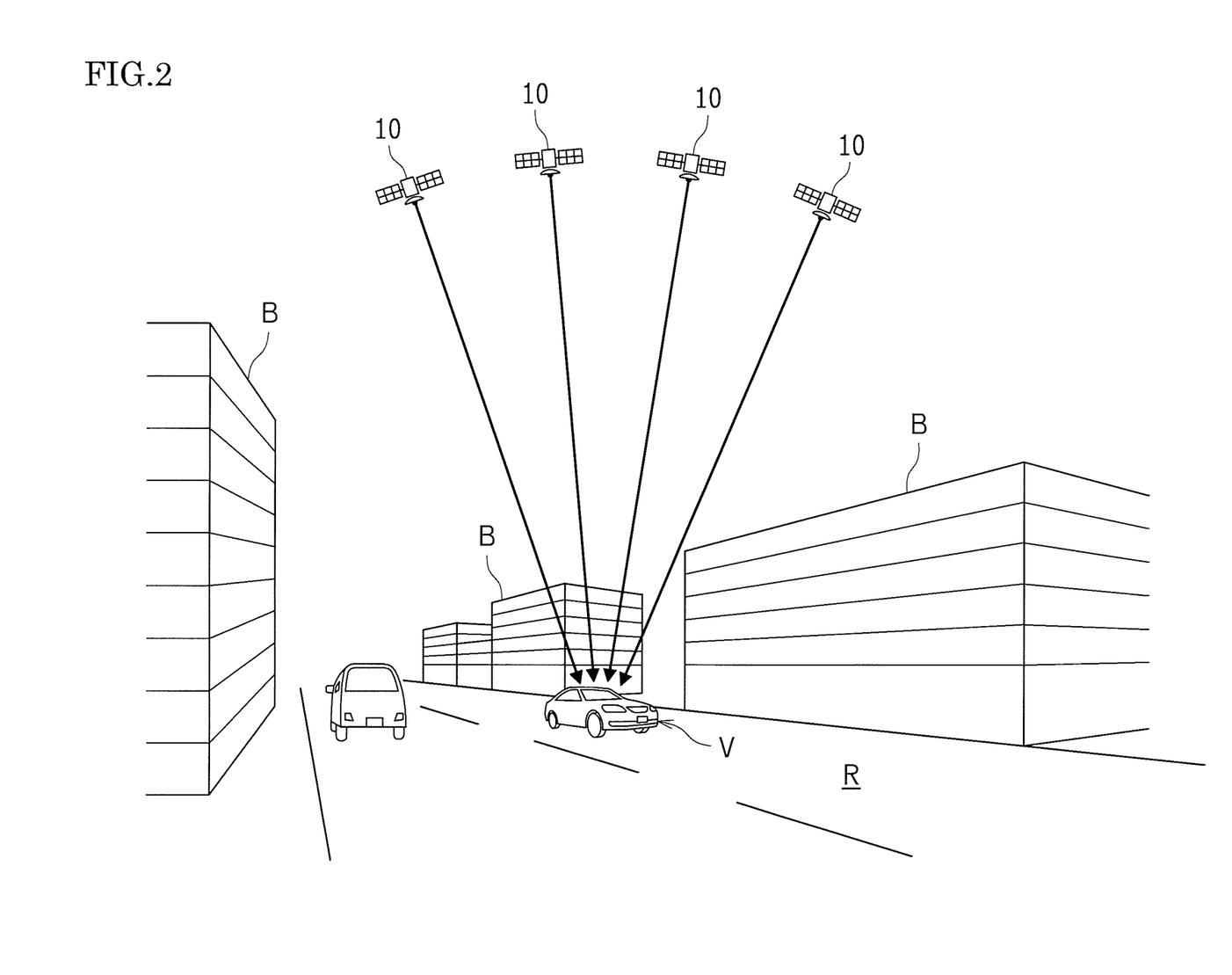
FIG. 2 is a diagram illustrating exemplarily a state in which a vehicle receives respective signals from GNSS satellites.

FIG. 2 is a diagram illustrating exemplarily a state in which a vehicle V receives the signals from the respective satellites 10. In FIG. 2, relatively low height buildings B are located on both sides of a road R. Thus, the vehicle V reliably receives the signals from the satellites 10.

<First Radio Communication Device>

Figure 3:
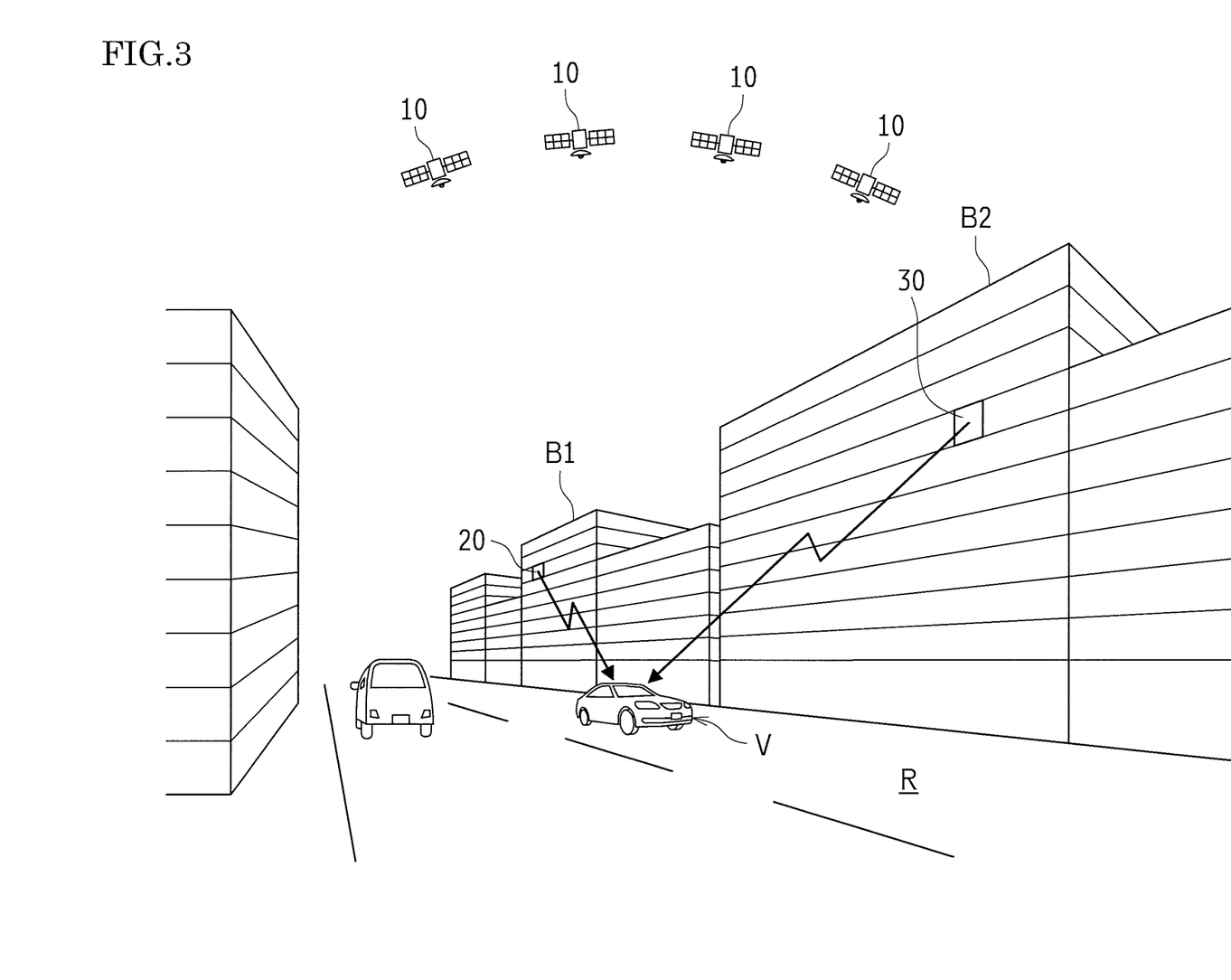
FIG. 3 is a diagram illustrating exemplarily a state in which a vehicle receives respective signals from radio communication devices that are respectively disposed in buildings.

As shown in FIG. 3, a first radio communication device 20 is a radio transmitting device whose antenna is fixed to a window or a wall surface of a building (structure fixed to the ground surface) B1. FIG. 3 is a diagram illustrating exemplarily a state in which the vehicle V receives the signal from the first radio communication device 20 disposed in the building B1. FIG. 3 also exemplarily shows a state in which the vehicle V receives a signal from a second radio communication device 30 (described later in detail) disposed in a building B2. In FIG. 3, only two radio communication devices 20 and 30 are disposed respectively in the two buildings B1 and B2. However, in the place where there are many high rise buildings along the road R, the radio communication devices are respectively disposed in the buildings at predetermined intervals. For the sake of understandability of the technique, in this embodiment, the description is given on the case in which the area having the high rise buildings is relatively small and only two radio communication devices 20 and 30 are disposed respectively in the two buildings B1 and B2.

As shown in FIG. 1, the first radio communication device 20 includes: a radio communication device information specifying unit (first radio communication device information specifying unit) 21; a storage unit (first storage unit) 22; a processing unit 23; and a radio transmitter (first radio transmitter) 24.

The radio communication device information specifying unit 21 specifies information on the first radio communication device 20 (e.g. position information, time information and the like). Therefore, the radio communication device information specifying unit 21 may also be called as a time specifying unit (first time specifying unit). As specific operations to specify the information, the radio communication device information specifying unit 21 receives signals from the plurality of satellites 10 and calculates position information (latitude, longitude and elevation) on the first radio communication device 20 as well as the current time. As to means for receiving the signals from the satellites 10, the first radio communication device 20 may have an internal receiving antenna (antenna for receiving the signals from the satellites 10), or may have a configuration allowing wired or wireless reception of information (i.e. reception by the radio communication device information specifying unit 21) from a receiving antenna (antenna for receiving the signals from the satellites 10) disposed on the top of the building B1. In order to use the current time, it is necessary to compensate delay time. The delay time is a period of time from receipt of the current time by the antenna for receiving the signals from the satellites 10 to transmission of the current time from a transmitting antenna of the first radio communication device 20 (i.e. it is the total amount of time for signal processing, time for passing the signals through the transmission line such as an electric wire, and the like). This correction of the delay time may be performed by any function block in the first radio communication device 20. Thus, the corrected time is transmitted from the first radio communication device 20 together with the position information on the first radio communication device 20.

As described above, with the configuration in which the position information on the first radio communication device 20 and the current time are calculated according to receipt of the signals from the plurality of satellites 10, it is not necessary for the first radio communication device 20 to store its position information. Also, it is not necessary for it to include the means for measuring the current time. Therefore, it is possible to simplify the configuration of the first radio communication device 20.

The storage unit 22 acquires and stores the information (i.e. the position information on the first radio communication device 20, the time information and the like) from the radio communication device information specifying unit 21. Since the installation location where the first radio communication device 20 is disposed is immovable (i.e. the position information does not change), the storage unit 22 can store the position information (i.e. the position information (latitude, longitude and elevation) on the first radio communication device 20) in advance. In this case, the acquisition operation of the position information by the radio communication device information specifying unit 21 is not required.

The processing unit 23 performs processing to convert the various pieces of information stored in the storage unit 22 into data for wireless communication by the radio transmitter 24.

The radio transmitter 24 transmits the data transmitted from the processing unit 23 (i.e. the data including the information on the first radio communication device 20) toward the road R, which the building B1 faces, within a predetermined range. More specifically, the data is transmitted in the predetermined range where the radio wave including the data reaches the position specifying unit 40 provided in the vehicle V that is traveling on the road R. The predetermined range where the radio wave reaches is, for example, 100 m. However, the value of the range is not limited thereto. It is appropriately determined according to the distance (i.e. the distance in the extending direction of the road R) between the installation location of the first radio communication device 20 and the installation location of the second radio communication device 30 (described later). In other words, the buildings B1 and B2, and the respective installation locations of the radio communication devices 20 and 30 in those buildings are determined according to the range where the radio waves from the radio communication devices 20 and 30 reach. More specifically, they are determined such that the radio waves transmitted from at least two radio communication devices 20 and 30 always reach the vehicle V that is traveling on the road R in a predetermined area (i.e. the area having many high rise buildings).

Figure 4:
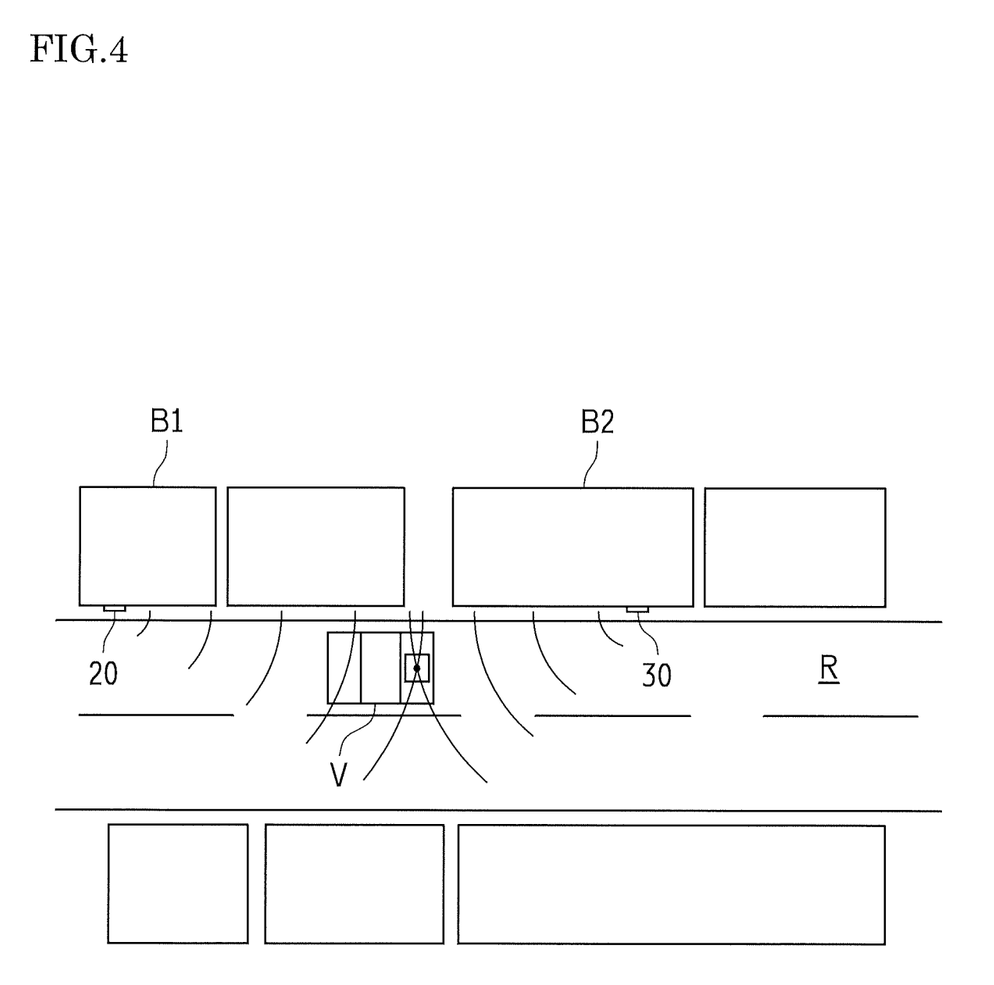
FIG. 4 is a plan view illustrating exemplarily a state in which a vehicle receives respective signals from radio communication devices that are respectively disposed in buildings.

FIG. 4 is a plan view illustrating exemplarily a state in which the vehicle V receives respective signals from the first radio communication device 20 disposed in the building B1 and the second radio communication device 30 disposed in the building B2.

<Second Radio Communication Device>

As shown in FIG. 3, the second radio communication device 30 is also a radio transmitting device whose antenna is fixed to a window or a wall surface of the building (structure fixed to the ground surface) B2. In the example shown in FIG. 3, the building B1 where the first radio communication device 20 is disposed is a different building from the building B2 where the second radio communication device 30 is disposed. However, the first radio communication device 20 and the second radio communication device 30 can also be disposed in the same building.

As shown in FIG. 1, the second radio communication device 30 includes, in the same way as the first radio communication device 20: a radio communication device information specifying unit (second radio communication device information specifying unit) 31; a storage unit (second storage unit) 32; a processing unit 33; and a radio transmitter (second radio transmitter) 34.

The radio communication device information specifying unit 31 specifies information on the second radio communication device 30 (e.g. position information, time information and the like). Therefore, the radio communication device information specifying unit 31 may also be called as a time specifying unit (second time specifying unit). The specific operations to specify the information is performed in the same way as the radio communication device information specifying unit 21 of the first radio communication device 20. The correction processing of the time information is also performed in the same way as described regarding the first radio communication device 20. Thus, the corrected time is transmitted together with the position information on the second radio communication device 30.

In the second radio communication device 30 also, with the configuration in which the position information on the second radio communication device 30 and the current time are calculated according to receipt of the signals from the plurality of satellites 10, it is not necessary for the second radio communication device 30 to store the position information. Furthermore, it is not necessary for it to include the means for measuring the current time. Therefore, it is possible to simplify the configuration of the second radio communication device 30.

The storage unit 32 acquires and stores the information (i.e. the position information on the second radio communication device 30, the time information and the like) from the radio communication device information specifying unit 31. By storing the position information (i.e. the position information (latitude, longitude and elevation) on the second radio communication device 30) in the storage unit 32 in advance, the acquisition operation of the position information by the radio communication device information specifying unit 31 is not required.

The processing unit 33 performs processing to convert the various pieces of information stored in the storage unit 32 into data for wireless communication by the radio transmitter 34.

The radio transmitter 34 transmits the data transmitted from the processing unit 33 (i.e. the data including the information on the second radio communication device 30) toward the road R, which the building B2 faces, within a predetermined range. More specifically, the data is transmitted in the predetermined range where the radio wave including the data reaches the position specifying unit 40 provided in the vehicle V that is traveling on the road R.

As described above, the configuration of the first radio communication device 20 is substantially the same as the configuration of the second radio communication device 30. However, the communication band for the data from the radio transmitter 24 is different from the communication band for the data from the radio transmitter 34. Alternatively, different channels are respectively set for the data from the radio transmitter 24 and the data from the radio transmitter 34. Thus, when the vehicle V receives the pieces of data from the radio transmitters 24 and 34, the vehicle V can recognize which data is transmitted by which of the radio communication devices 20 and 30. Furthermore, each individual piece of ID information may be stored in the corresponding piece of data so as to recognize which piece of data is transmitted from which of the radio communication devices 20 and 30 even when the same band or the same channel is used.

<Position Specifying Unit>

The position specifying unit 40 is mounted on the vehicle V. The position specifying unit 40 receives the signals from the satellites 10 or the signals from the radio communication devices 20 and 30 so as to specify the position of the vehicle (subject vehicle) V based on the information included in the signals.

As shown in FIG. 1, the position specifying unit 40 includes: a GNSS signal receiver 41; a time specifying unit 42; a radio receiver 43; a position specification processing unit 44; and a storage unit 45.

The GNSS signal receiver 41 receives the navigation messages (satellite signals) transmitted from the GNSS signal transmitters 12 of the respective satellites 10. Specifically, the GNSS signal receiver 41 receives the position information (satellite position information) and the time information from each of the satellites 10. That is, it receives the pieces of information transmitted from the respective satellites 10 when the vehicle V is not traveling in the predetermined area (i.e. the area having many high rise buildings). (See the state shown in FIG. 2).

The time specifying unit 42 extracts the time information out of the pieces of information included in the satellite signals that are received by the GNSS signal receiver 41, and specifies each time when the corresponding satellite 10 transmits the information. Also, the time specifying unit 42 specifies the current time (current time of the vehicle V) based on the extracted time information.

The radio receiver 43 receives the information transmitted from the radio transmitter 24 of the first radio communication device 20 and the information transmitted from the radio transmitter 34 of the second radio communication device 30. That is, the radio receiver 43 receives each piece of information transmitted from the radio transmitters 24 and 34 of the radio communication devices 20 and 30 when the vehicle V is traveling on the road R in the predetermined area (i.e. the area having many high rise buildings). (See the state illustrated in FIG. 3).

The position specification processing unit 44 can receive the information from the time specifying unit 42 and the information from the radio receiver 43. When the information from the time specifying unit 42 includes the time information transmitted from the respective satellites 10 (i.e. when the GNSS signal receiver 41 receives the signals from the respective satellites 10), the position specification processing unit 44 performs the processing to specify the position of the vehicle V based on the signals from the satellites 10. Also, when the position specification processing unit 44 receives the information from the radio receiver 43 (i.e. the information from the radio communication devices 20 and 30), the position specification processing unit 44 performs the processing to specify the position of the vehicle V based on the signals from the radio communication devices 20 and 30.

Here, a description will be given on the basic principle for specifying the position performed by the position specification processing unit 44. What is exemplarily described is the basic principle for specifying the position of the vehicle V based on the signals from the satellites 10. However, this basic principle is the same as that for specifying the position of the vehicle V based on the signals from the radio communication devices 20 and 30.

The position specification processing unit 44 calculates respective distances (pseudoranges) from the plurality of satellites 10 to the position specifying unit 40 by receiving the radio waves (satellite signals) from the plurality of satellites 10. Then, the position specification processing unit 44 measures the position of the vehicle V on which the position specifying unit 40 is mounted based on the pseudoranges.

More specifically, when the signals are received from four (i.e. the first to the fourth) satellites 10, the position coordinates of the position specifying unit 40 are defined as (X, Y, Z), and the time error of the clock (not shown) inside the position specifying unit 40 is defined as $\Delta T$. Also, the position coordinates of the first satellite 10 are defined as (X1, Y1, Z1) and the observation distance is defined as $\rho 1$. The position coordinates of the second satellite 10 are defined as (X2, Y2, Z2) and the observation distance is defined as $\rho 2$. The position coordinates of the third satellite 10 are defined as (X3, Y3, Z3) and the observation distance is defined as $\rho 3$. The position coordinates of the fourth satellite 10 are defined as (X4, Y4, Z4) and the observation distance is defined as $\rho 4$.

Each signal transmitted from the corresponding satellite 10 is delayed to reach the GNSS signal receiver 41 of the position specifying unit 40 by the time required for the radio wave to travel the distance between each satellite 10 and the position specifying unit 40. Therefore, by calculating each time required for the radio wave to travel from each of the plurality of satellites 10, it is possible to obtain the position of the position specifying unit 40 using positioning calculation.

For example, when the position of the position specifying unit 40 is calculated by triangulation, the following formulas (1) to (4) are established:

$$\rho 1 = c \cdot \Delta T + \{(X1-X)^2 + (Y1-Y)^2 + (Z1-Z)^2\}^{1/2} \quad (1);$$

$$\rho 2 = c \cdot \Delta T + \{(X2-X)^2 + (Y2-Y)^2 + (Z2-Z)^2\}^{1/2} \quad (2);$$

$$\rho 3 = c \cdot \Delta T + \{(X3-X)^2 + (Y3-Y)^2 + (Z3-Z)^2\}^{1/2} \quad (3); \text{ and}$$

$$\rho 4 = c \cdot \Delta T + \{(X4-X)^2 + (Y4-Y)^2 + (Z4-Z)^2\}^{1/2} \quad (4).$$

In this way, the position (X, Y, Z) of the position specifying unit 40, namely, the position of the vehicle V can be specified. Also, the clock (not shown) inside the position specifying unit 40 is calibrated by $\Delta T$. Thus, the accurate current time can be obtained. When the mobile object cannot receive the signals from the satellites 10 and uses time information on the signals from the GNSS satellites previously acquired, the clock (not shown) inside the position specifying unit 40 is calibrated using the time information previously acquired, and then continuously clocks the time using an auto operating reference transmitter (not shown) built in the clock (not shown). The frequency of the auto operating reference transmitter is set to satisfy a required level of accuracy and stability for positioning calculation.

The above is the basic principle for specifying the position of the vehicle V and for acquiring the current time based on the signals from the satellites 10.

On the other hand, when the position of the vehicle V is specified based on the signals from the radio communication devices 20 and 30, the distance from the position specifying unit 40 to the first radio communication device 20 and the distance from the position specifying unit 40 to the second radio communication device 30 are calculated based on the same principle as the above-described case. Out of the intersections of two spheres, both of which are sets of the points located respectively at the above distances, the intersection located on the road R (i.e. intersection also intersecting with the traveling track on the road R) can be specified as the position of the vehicle V. That is, the position of the vehicle V can be specified by a known map matching for the intersections of the spheres. Since the signals from the radio communication devices 20 and 30 include time information, the radio communication devices 20 and 30 may also be called as the time information transmitting terminal.

The storage unit 45 stores the position information on the vehicle V specified as described above. That is, every time the position of the vehicle V is newly calculated (specified), the stored position information on the vehicle V is updated.

—Position Specification Processing Operations—

Figure 5:
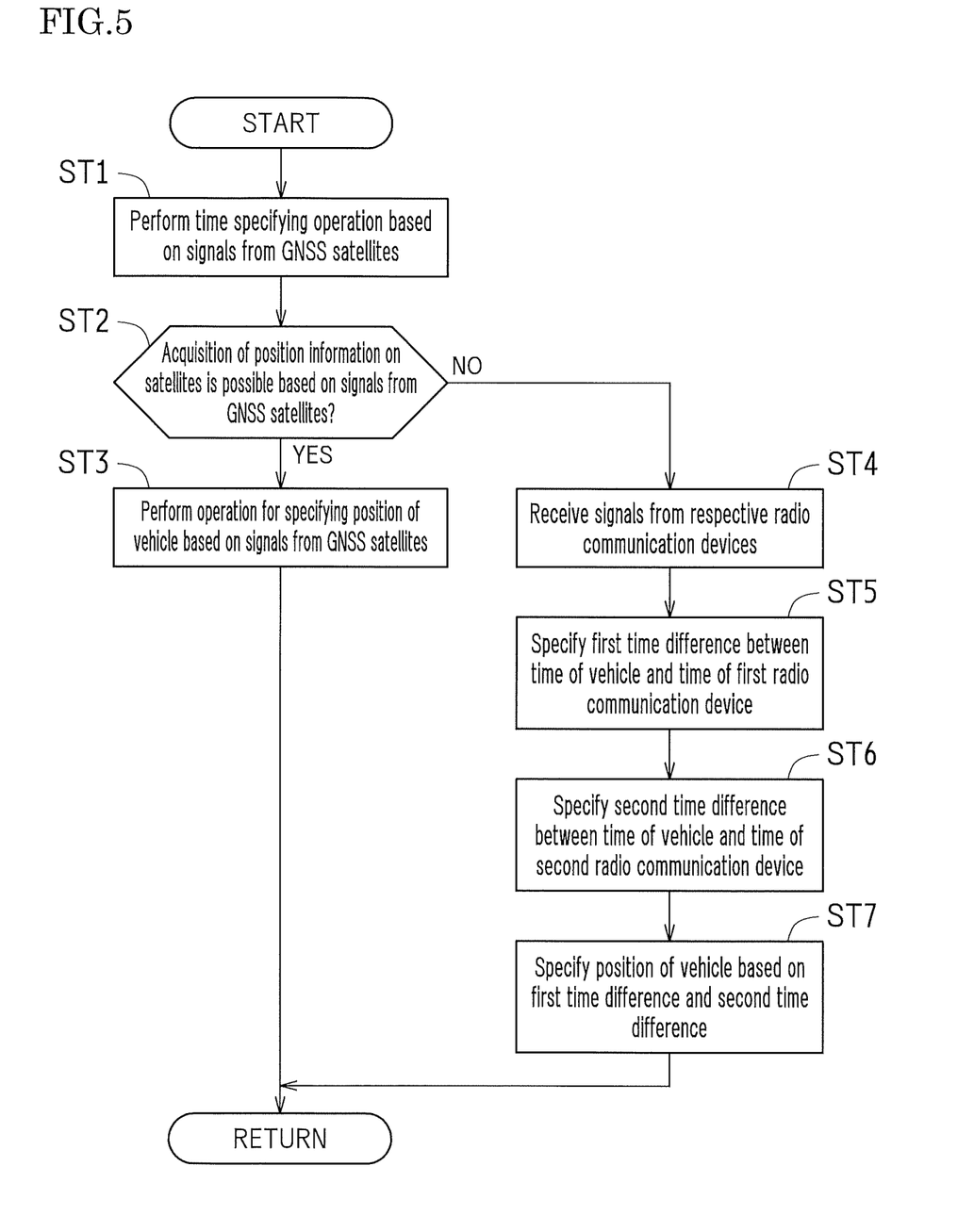
FIG. 5 is a flowchart indicating a procedure of position specification processing operations in the position specifying system according to the first embodiment.

Next, a description will be given on the position specification processing operations in the position specifying system. FIG. 5 is a flowchart indicating a procedure of position specification processing operations.

First, in step ST 1, the time specifying operation is performed based on the signals from the satellites 10. In this case, when the signals from the satellites 10 are not obstructed by high rise buildings and the like, the GNSS signal receiver 41 receives the signals from the satellites 10, and the time specifying unit 42 specifies the current time (i.e. the time of the vehicle V).

In step ST 2, it is determined whether the signals from the satellites 10 are appropriately received so that the position information on the satellites 10 can be acquired. That is, as described above, when the signals from the satellites 10 are unobstructed by the high rise buildings and the like, the GNSS signal receiver 41 receives the signals from the satellites 10, which allows the acquisition of the position information on the satellites 10. Thus, the determined result in step ST 2 is "YES". On the other hand, when the signals from the satellites 10 are obstructed by the high rise buildings and the like, the GNSS signal receiver 41 fails to receive the signals from the satellites 10, and the position information on the satellites 10 cannot be acquired. Thus, the determined result in step ST 2 is "NO".

When the position information on the satellites 10 can be acquired and the determined result in step ST 2 is "YES", the procedure advances to step ST 3 so as to perform the operation for specifying the position of the vehicle by calculating the observation distances $\rho 1$ to $\rho 4$ as described above.

In the case where the position information on the satellites 10 can be continuously acquired, the operations in steps ST 1 to ST 3 are repeatedly performed so as to specify the position of the vehicle V. The specified position of the vehicle V is once stored in the storage unit 45, and is transmitted to an ECU (not shown) that controls autonomous driving.

On the other hand, in the case where the position information on the satellites 10 cannot be acquired and the determined result in step ST 2 is "NO", the procedure advances to step ST 4 so as to receive the signals from the first radio communication device 20 and the second radio communication device 30. Then, in step ST 5, a first time difference is specified based on the signal received from the first radio communication device 20. The first time difference is a time lag between the time of the vehicle V and the time of the first radio communication device 20 (time when the first radio communication device 20 transmits the signal). Similarly, in step ST 6, a second time difference is specified based on the signal received from the second radio communication device 30. The second time difference is a time lag between the time of the vehicle V and the time of the second radio communication device 30 (time when the second radio communication device 30 transmits the signal).

In step ST 7, the distance between the position specifying unit 40 and the first radio communication device 20 is calculated based on the specified first time difference, and the distance between the position specifying unit 40 and the second radio communication device 30 is calculated based on the specified second time difference. Then, out of the intersections of the two spheres, both of which are sets of the points located respectively at the above distances, the intersection located on the road R (i.e. intersection also intersecting with the traveling track on the road R) is specified as the position of the vehicle V.

Effects of Embodiment

In this embodiment as described above, when the position of the vehicle V is specified in the state in which the signals from the satellites 10 cannot be received, the position information (first position information) and the time information (first time information) are transmitted to the radio receiver 43 of the vehicle V from the radio transmitter 24 provided in the first radio communication device 20 that is disposed in a structure fixed to the ground surface (i.e. the building B1). Also, the position information (second position information) and the time information (second time information) are transmitted to the radio receiver 43 of the vehicle V from the radio transmitter 34 provided in the second radio communication device 30 that is disposed in a structure fixed to the ground surface (i.e. the building B2). Thus, the radio receiver 43 of the vehicle V receives the respective pieces of position information and time information, and the position specification processing unit 44 specifies the position of the vehicle V based on the respective pieces of position information received by the radio receiver 43 and the respective time differences (i.e. the first time difference and the second time difference) that are differences between the time from the time information received by the radio receiver 43 and the time of the vehicle V. In this way, the position of the vehicle V can be specified using the radio communication devices 20 and 30 even when the position of the vehicle V cannot be specified using the signals from the satellites 10.

Second Embodiment

Here, the second embodiment is described. In this embodiment, the manner of transmitting/receiving the information between the position specifying unit 40 and the radio communication devices 20 and 30 differs from that in the first embodiment. Thus, in this description, only the points of difference between the second embodiment and the first embodiment are described.

Figure 6:
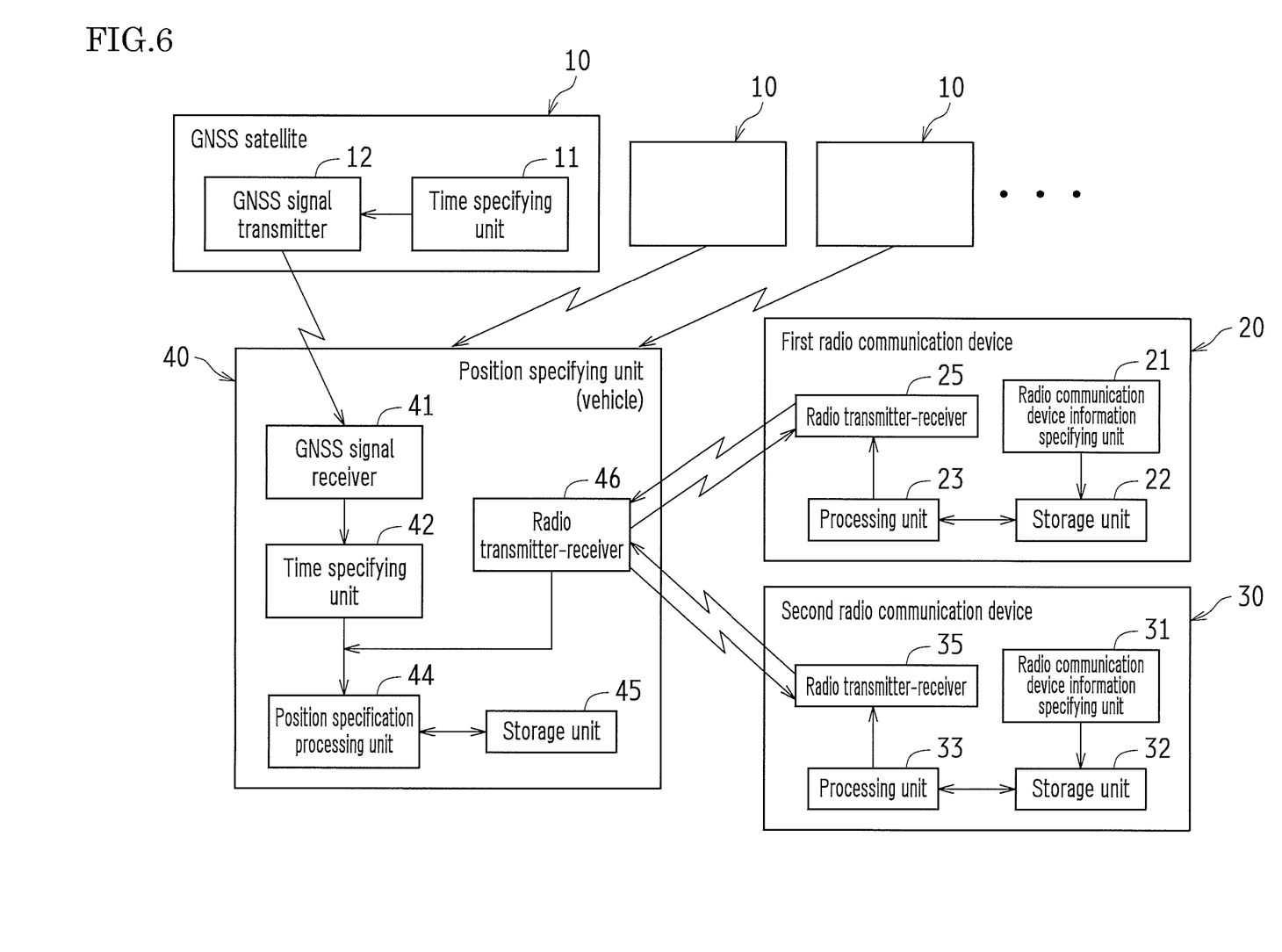
FIG. 6 is a block diagram indicating a schematic configuration of a position specifying system according to a second embodiment.

FIG. 6 is a block diagram indicating a schematic configuration of the position specifying system according to this embodiment.

As shown in FIG. 6, the position specifying unit 40 of this embodiment includes a radio transmitter-receiver 46 in place of the radio receiver 43. The radio transmitter-receiver 46 transmits the time information (i.e. the information on the current time recognized by the vehicle V) to the respective radio communication devices 20 and 30 in a state in which the position information on the satellites 10 cannot be acquired.

The state in which the position information cannot be acquired means the case where the position of the vehicle V (mobile object) cannot be specified by the calculation because the satellite signals from a plurality of GNSS cannot be acquired. In this case, the radio transmitter-receiver 46 transmits, to the radio communication devices 20 and 30, the time information transmitted from at least one of the satellites 10 or the time information on the satellite signal previously acquired. When the mobile object uses the time information on the satellite signal previously acquired, the clock (not shown) inside the position specifying unit 40 is calibrated using the time information previously acquired, and then continuously clocks the time using the auto-operating reference transmitter built in the clock (not shown).

Also, the radio communication devices 20 and 30 includes, respectively, radio transmitters-receivers 25 and 35 in place of the radio transmitters 24 and 34. When the radio transmitters-receivers 25 and 35 receive the time information from the radio transmitter-receiver 46, the radio transmitters-receivers 25 and 35 respectively transmit, to the radio transmitter-receiver 46, the position information on the radio communication devices 20 and 30 together with the above time information.

Figure 7:
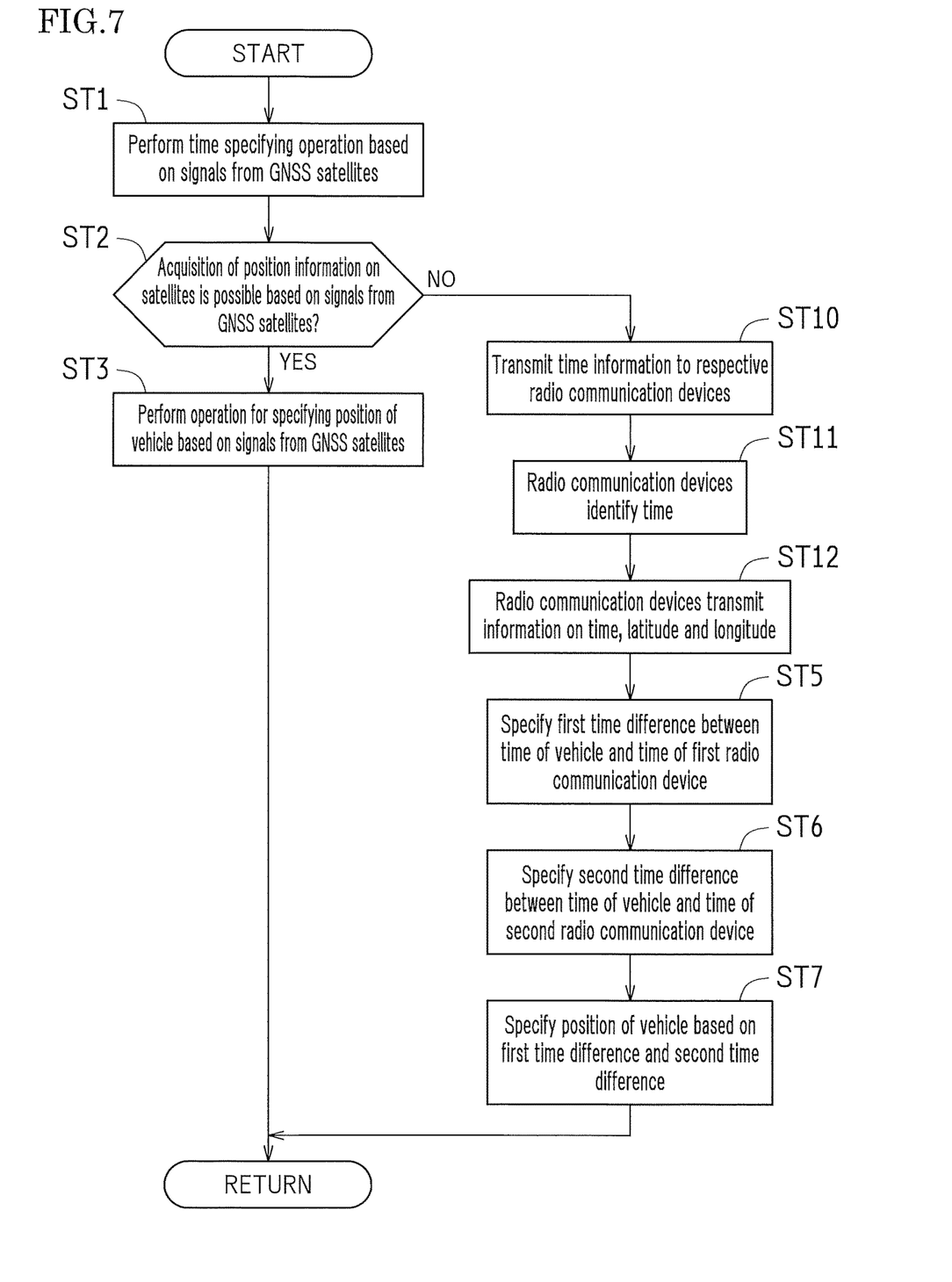
FIG. 7 is a flowchart indicating a procedure of position specification processing operations in the position specifying system according to the second embodiment.

FIG. 7 is a flowchart indicating a procedure of position specification processing operations in this embodiment. Since the operations in steps ST 1 to ST 3 and ST 5 to ST 7 in this flowchart are the same as the operations in steps ST 1 to ST 3 and ST 5 to ST 7 in the flowchart (FIG. 5) of the above-described first embodiment, the description on those operations is omitted here.

When the GNSS signal receiver 41 is in the state in which the position information on the satellites 10 cannot be acquired, and thus the determined result is "NO" in step ST 2, the procedure advances to step ST 10 in which the radio transmitter-receiver 46 of the position specifying unit 40 transmits the time information (i.e. the information on the current time recognized by the vehicle V) to the respective radio communication devices 20 and 30. In the radio communication devices 20 and 30, this current time is used as the information to identify the sender in order to respond to respective messages transmitted from a plurality of vehicles V. Then, the procedure advances to step ST 11 in which the radio transmitters-receivers 25 and 35 of the radio communication devices 20 and 30 receive the time information.

In step ST 12, the radio transmitters-receivers 25 and 35 of the radio communication devices 20 and 30 transmit, to the radio transmitter-receiver 46, the respective pieces of position information (i.e. information on latitude, longitude, height from the road surface and the like) of the first radio communication device 20 and the second radio communication device 30 together with the above time information. As to the timing of transmission to the radio transmitter-receiver 46, the transmission may be performed after elapse of certain delay time set in advance in the radio communication devices 20 and 30 or variable delay time. In such a case, the response includes, apart from the position information, the length of the added delay time. The reason for setting the delay time is to prevent interference that may be generated if there are many radio communication devices in the vicinity and they all transmit the response at once. The position specifying unit 40 determines whether the received response is exactly to its own transmitted massage by comparing the time information added to the response by the radio communication devices to the time information added when the vehicle V receives the message. The distance can be obtained by the following steps: measuring the period of time from sending to receiving; subtracting the delay time based on the delay time information added to the response message; obtaining the round trip distance multiplying by the speed of light c; and further dividing the round trip distance by 2. Then, the operations in above-described steps ST 5 to ST 7 are performed. Thus, the position specification processing unit 44 of the position specifying unit 40 specifies the position of the vehicle V.

In this embodiment also, the position of the vehicle V can be specified using the radio communication devices 20 and 30 even when the position of the vehicle V cannot be specified using the signals from the satellites 10, similarly to the first embodiment.

OTHER EMBODIMENTS

The present invention is not limited to the embodiments as described above. All modifications and changes that come within the meaning and range of equivalency of the claims are intended to be embraced in the technical scope of the present invention.

For example, to the respective embodiments as described above, the present invention is applied to a position specifying system for acquiring the position information on the vehicle V as information supplied for autonomous driving or the like of the vehicle V. However, the present invention is not limited thereto. It may be applied to a position specifying system for acquiring the position information on the vehicle V as information supplied to a car navigation system mounted on the vehicle V. Also, the mobile object to which the position specifying system is applied is not limited to the vehicle V. The mobile object may be a plane, a ship, a motorcycle, a railway car, or the like. In this description, the mobile object means an object having self-propelling means. As the self-propelling means, tires, wheels, crawlers or wires may be driven by an engine or a motor.

Also in the respective embodiments as described above, the structures in which the radio communication devices 20 and 30 are respectively disposed are the buildings B1 and B2. However, the present invention is not limited thereto. Any structures may be used provided that they are fixed to the ground surface. For example, when the radio communication devices 20 and 30 are respectively provided on poles that are set upright in the ground surface, these poles are the structures in the present invention.

Also in the respective embodiments as described above, the radio receiver 43 (or the radio transmitter-receiver 46) receives the respective pieces of information from the two radio communication devices 20 and 30. However, the present invention is not limited thereto. The radio receiver 43 (or the radio transmitter-receiver 46) may receive respective pieces of information from three or more number of radio communication devices. With this configuration, the position of the vehicle V can be specified with higher accuracy.

Also in the respective embodiments as described above, the pieces of position information on the radio communication devices 20 and 30 are acquired from the radio communication devices 20 and 30. However, the present invention is not limited thereto. The position information on the radio communication devices 20 and 30 may be stored in advance in the storage unit 45 of the position specifying unit 40, and the respective positions of the radio communication devices 20 and 30 may be specified based on identification information (e.g. individual ID information) transmitted from the respective radio communication devices 20 and 30 (i.e. the respective positions are extracted from the information stored in the storage unit 45). In this case, the respective pieces of information transmitted from the radio communication devices 20 and 30 to the vehicle V do not include the position information. Thus, it is possible to reduce the amount of information to send/receive between the vehicle V and the radio communication devices 20 and 30. The position information that is linked with the respective positions of the radio communication devices 20 and 30 may be stored in advance in the storage unit 45. Alternatively, the mobile object may receive such information from any radio communication devices. Since the mobile object can acquire the position information, it is possible to reduce the amount of communication by setting the mobile object to acquire the information within a certain range of distance therefrom (for example, in the range of a few km).

Also in the respective embodiments as described above, the position information from the respective radio communication devices 20 and 30 includes the elevation. However, in the present invention, the elevation is not indispensable as the element of the position information from the radio communication devices 20 and 30. That is, the position information transmitted from the radio communication devices 20 and 30 may be constituted of only the latitude and the longitude. If the information includes the elevation, the position of the target mobile object can be specified with further accuracy. Also, in place of the elevation, the position information may include the height from the road surface on which the vehicle V travels. Such a configuration has an advantage of avoiding the calculation of the difference in the elevation between the vehicle V and the respective radio communication devices.

Figure 8:
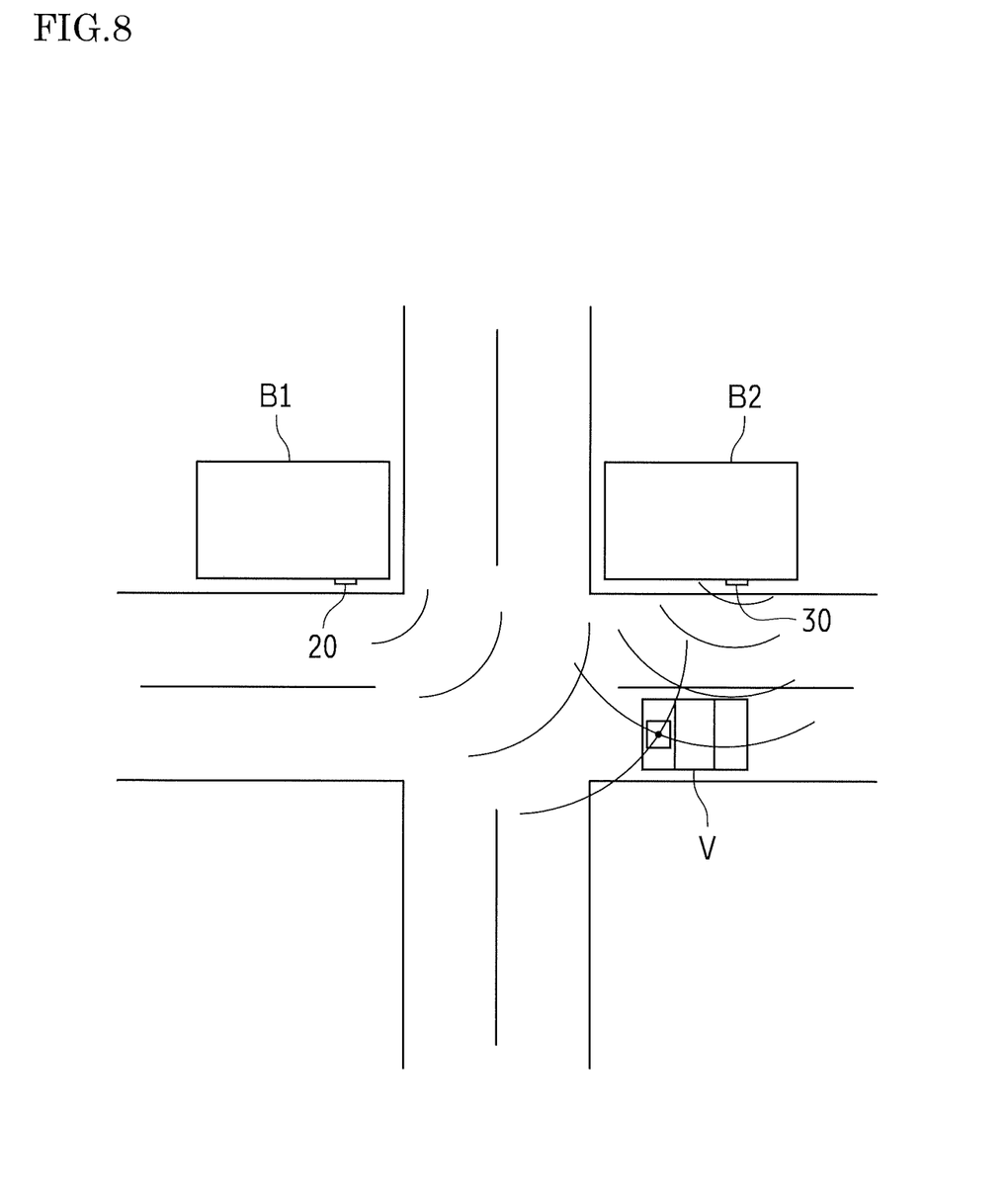
FIG. 8 is a plan view illustrating exemplarily another state in which a vehicle receives respective signals from radio communication devices that are respectively disposed in buildings.

Also in the respective embodiments as described above, the information from the radio communication devices 20 and 30 is received by the vehicle V that travels on the lane on the side of the buildings B1 and B2. However, as shown in FIG. 8, the information from the radio communication devices 20 and 30 may be received by the vehicle V that travels on the lane on the opposite side of the buildings B1 and B2 (i.e. on the opposite lane).

The position specifying unit 40 may also receive, by radio communication, the first position information and the second position information from a position information acquiring device other than the radio communication devices 20 and 30 (e.g. a mobile phone base station). With this configuration, the information is transmitted/received between the position specifying unit 40 and the position information acquiring device while the information is transmitted/received between the radio receiver 43 (or the radio transmitter-receiver 46) of the position specifying unit 40 and the radio communication devices 20 and 30. In this way, the operations for acquiring the first position information and the second position information can be performed concurrently, which leads to speed-up of the processing operation for specifying the portion of the vehicle V.

INDUSTRIAL APPLICABILITY

The present invention is suitably applied to a position specifying system for acquiring the position information on a vehicle as information supplied for autonomous driving or the like.

DESCRIPTION OF REFERENCE NUMERALS

10 GNSS satellite
20 First radio communication device
21 Radio communication device information specifying unit (First radio communication device information specifying unit)
22 Storage unit (First storage unit)
24 Radio transmitter (First radio transmitter)
25 Radio transmitter-receiver
30 Second radio communication device
31 Radio communication device information specifying unit Second radio communication device information specifying unit)
32 Storage unit (Second storage unit)
34 Radio transmitter (Second radio transmitter)
35 Radio transmitter-receiver
40 Position specifying unit
41 GNSS signal receiver
43 Radio receiver
44 Position specification processing unit
45 Storage unit
46 Radio transmitter-receiver
B1, B2 Building (Structure)
V Vehicle (Mobile object)

The invention claimed is:

1. A position specifying system for a mobile object, the position specifying system specifying a position of the mobile object using a first radio communication device in a structure and a second radio communication device in a structure, wherein first position information, which is about a position of the first radio communication device, is associated with the first radio communication device, and second position information, which is about a position of the second radio communication device, is associated with the second radio communication device, the first radio communication device includes a first time specifying unit configured to specify a first time, and the second radio communication device includes a second time specifying unit configured to specify a second time, the first radio communication device includes a first radio transmitter configured to transmit the first position information and the first time, and the second radio communication device includes a second radio transmitter configured to transmit the second position information and the second time, the mobile object includes: a radio receiver configured to receive the first position information and the first time transmitted from the first radio transmitter, and configured to receive the second position information and the second time transmitted from the second radio transmitter; and a position specification processing unit configured to specify the position of the mobile object based on the first position information, the first time, the second position information and the second time, all of which are received by the radio receiver, a first timing of transmission of the first position information and the first time to the radio receiver of the mobile object is after elapse of a first delay time set in advance in the first radio communication device or after elapse of a first variable delay time where transmission includes a length of the first delay time apart from the first position information, and a second timing of transmission of the second position information and the second time to the radio receiver of the mobile object is after elapse of a second delay time set in advance in the second radio communication device or after elapse of a second variable delay time where transmission includes a length of the second delay time apart from the second position information.

2. The position specifying system for a mobile object according to claim 1, wherein the position specification processing unit is configured to specify, as the position of the mobile object, a position of the mobile object on a road on which the mobile object travels based on: a distance from the first radio communication device to the mobile object, the distance being calculated based on a first time difference between a current time recognized by the mobile object and the first time; and a distance from the second radio communication device to the mobile object, the distance being calculated based on a second time difference between the current time recognized by the mobile object and the second time.

3. The position specifying system for a mobile object according to claim 2, wherein the first time specifying unit is configured to specify the first time based on time information included in information from GNSS satellites, and the second time specifying unit is configured to specify the second time based on time information included in information from the GNSS satellites, and the mobile object is configured to recognize the current time based on time information included in information from the GNSS satellites.

4. The position specifying system for a mobile object according to claim 1, wherein the first time in the first radio communication device is compensated for delay time including time for signal processing and time for passing a signal through a transmission line, and the second time in the second radio communication device is compensated for delay time including time for signal processing and time for passing a signal through a transmission line.

5. The position specifying system for a mobile object according to claim 1, wherein the mobile object further includes a GNSS signal receiver configured to receive information including satellite position information from a plurality of GNSS satellites, and when the GNSS signal receiver cannot receive the satellite position information from the plurality of GNSS satellites, the position specification processing unit is configured to specify the position of the mobile object based on the first position information, the first time, the second position information and the second time, all of which are received by the radio receiver.

6. The position specifying system for a mobile object according to claim 1, wherein the structure is a building fixed to the ground surface, and the first radio communication device and the second radio communication device are each located on a side of a road on which the mobile object travels.

7. The position specifying system for a mobile object according to claim 1, wherein the first radio communication device includes a first radio communication device information specifying unit configured to specify the first position information, which is the information on the position of the first radio communication device, by receiving information including satellite position information from a plurality of GNSS satellites, and the second radio communication device includes a second radio communication device information specifying unit configured to specify the second position information, which is the information on the position of the second radio communication device, by receiving information including satellite position information from a plurality of GNSS satellites.

8. The position specifying system for a mobile object according to claim 1, wherein the first radio communication device includes a first storage unit configured to store the first position information to be transmitted, by the first radio transmitter, to the radio receiver of the mobile object, and the second radio communication device includes a second storage unit configured to store the second position information to be transmitted, by the second radio transmitter, to the radio receiver of the mobile object.

9. The position specifying system for a mobile object according to claim 1, wherein the mobile object is configured to receive the first position information and the second position information, by radio communication, from a position information acquiring device other than the first radio communication device and the second radio communication device in place of receiving the first position information from the first radio communication device and receiving the second position information from the second radio communication device.

10. The position specifying system for a mobile object according to claim 1, wherein the mobile object includes a storage unit configured to store the position information on the first radio communication device and the position information on the second radio communication device, and the mobile object is configured to receive ID information on the first radio communication device transmitted from the first radio communication device to specify the position of the first radio communication device by reading the position information on the first radio communication device from the storage unit while the mobile object receives ID information on the second radio communication device transmitted from the second radio communication device to specify the position of the second radio communication device by reading the position information on the second radio communication device from the storage unit, in place of receiving the first position information from the first radio communication device and receiving the second position information from the second radio communication device.

11. The position specifying system for a mobile object according to claim 1, wherein
the mobile object is configured to transmit time information on a current time recognized by the mobile object,
when the first radio communication device receives the time information from the mobile object, the first radio communication device is configured to transmit the first position information together with the time information to the mobile object, and when the second radio communication device receives the time information from the mobile object, the second radio communication device is configured to transmit the second position information together with the time information to the mobile object,
the mobile object is configured to calculate a distance to the first radio communication device based on a period of time from transmission of the time information to the first radio communication device to receipt of the time information from the first radio communication device, and
the mobile object is configured to calculate a distance to the second radio communication device based on a period of time from transmission of the time information to the second radio communication device to receipt of the time information from the second radio communication device.

12. A mobile object for a position specifying system specifying a position of the mobile object using a first radio communication device in a structure and a second radio communication device in a structure, wherein
first position information, which is about a position of the first radio communication device, is associated with the first radio communication device, and second position information, which is about a position of the second radio communication device, is associated with the second radio communication device,
the first radio communication device includes a first time specifying unit configured to specify a first time, and the second radio communication device includes a second time specifying unit configured to specify a second time,
the first radio communication device includes a first radio transmitter configured to transmit the first position information and the first time, and the second radio communication device includes a second radio transmitter configured to transmit the second position information and the second time,
the mobile object includes: a radio receiver configured to receive the first position information and the first time transmitted from the first radio transmitter, and configured to receive the second position information and the second time transmitted from the second radio transmitter; and a position specification processing unit configured to specify the position of the mobile object based on the first position information, the first time, the second position information and the second time, all of which are received by the radio receiver,
a first timing of transmission of the first position information and the first time to the radio receiver of the mobile object is after elapse of a first delay time set in advance in the first radio communication device or after elapse of a first variable delay time where transmission includes a length of the first delay time apart from the first position information, and
a second timing of transmission of the second position information and the second time to the radio receiver of the mobile object is after elapse of a second delay time set in advance in the second radio communication device or after elapse of a second variable delay time where transmission includes a length of the second delay time apart from the second position information.

13. The mobile object according to claim 12, wherein
the mobile object is a vehicle configured to perform autonomous driving based on the position specified by the position specification processing unit.

* * * * *